United States Patent [19]

Yamaguchi

[11] Patent Number: 5,280,306
[45] Date of Patent: Jan. 18, 1994

[54] IMAGE REPRODUCING APPARATUS
[75] Inventor: Akira Yamaguchi, Kanagawa, Japan
[73] Assignee: Fuji Photo Film Co., Ltd., Kanagawa, Japan
[21] Appl. No.: 974,217
[22] Filed: Nov. 10, 1992
[30] Foreign Application Priority Data
Nov. 12, 1991 [JP] Japan .................. 3-295809
[51] Int. Cl.⁵ .......................... H04N 1/21; B41J 2/435
[52] U.S. Cl. .................................. 346/108
[58] Field of Search .................. 346/108, 1.1, 107; 358/296, 298, 300, 302

[56] References Cited
U.S. PATENT DOCUMENTS
4,816,924  3/1989  Sekiya ......................... 358/296
4,872,065  10/1989  Isono et al. .................... 358/494

Primary Examiner—Mark J. Reinhart
Attorney, Agent, or Firm—Sughrue, Mion, Zinn, Macpeak & Seas

[57] ABSTRACT

A main-scanning start point sensor detects a laser beam at a position outside of an effective main scanning region with respect to a photosensitive material, which is to be scanned with the laser beam produced by a semiconductor laser and is moving in a subscanning direction. A leading end sensor detects a leading end of the photosensitive material by detecting that the laser beam has been blocked by the leading end. Generators generate a first level driving signal, which sets an emission intensity of the semiconductor laser at a first level, and a second level driving signal, which sets the emission intensity at a second level lower than the first level. During a main scanning period, in which the laser beam can impinge upon the effective main scanning region, the second level driving signal and a modulating signal, which modulates the laser beam with an image signal, are fed into a semiconductor laser driving circuit respectively before and after the leading end is detected. During a main scanning period, in which the laser beam impinges upon the main-scanning start point sensor, the first level driving signal is fed into the semiconductor laser driving circuit.

3 Claims, 2 Drawing Sheets

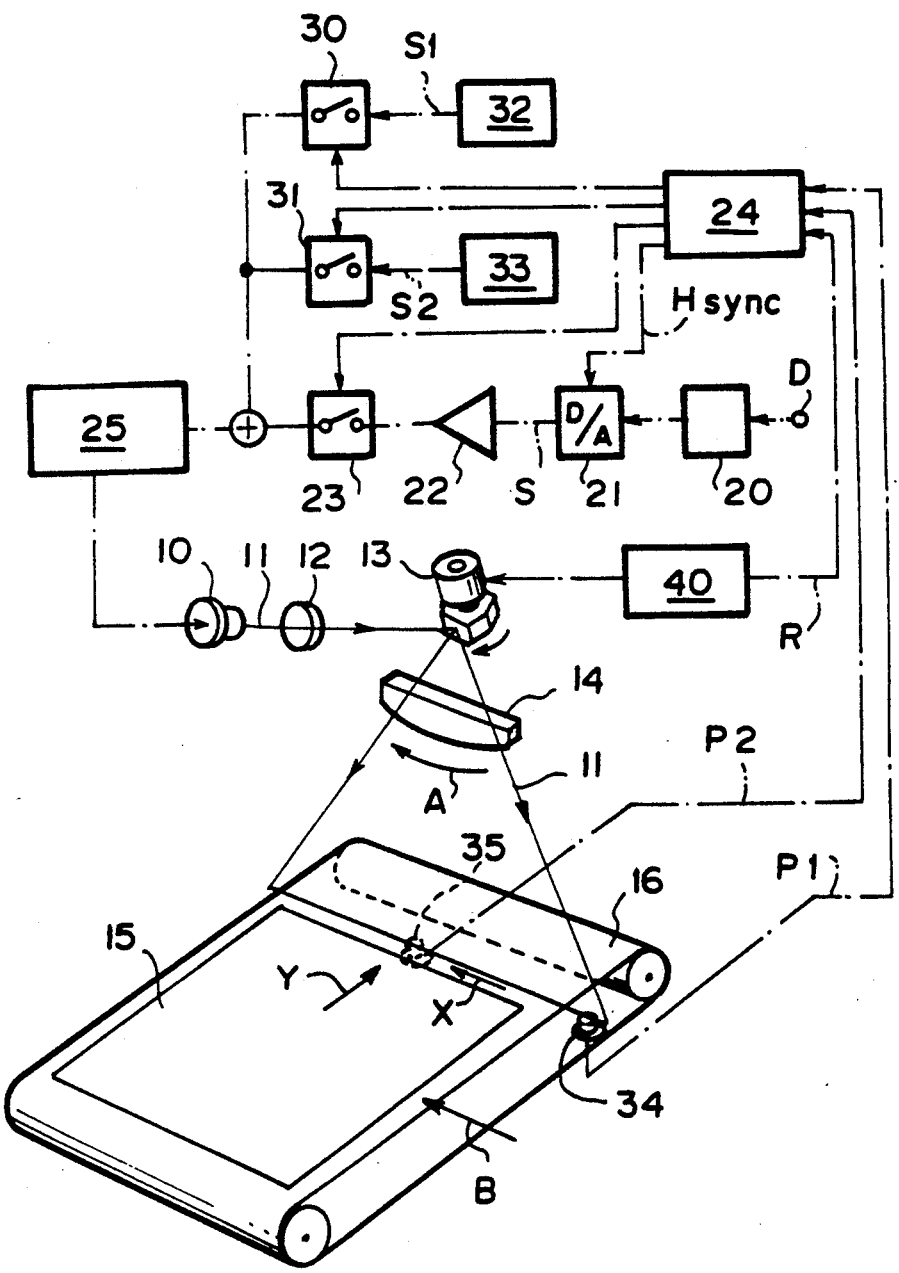

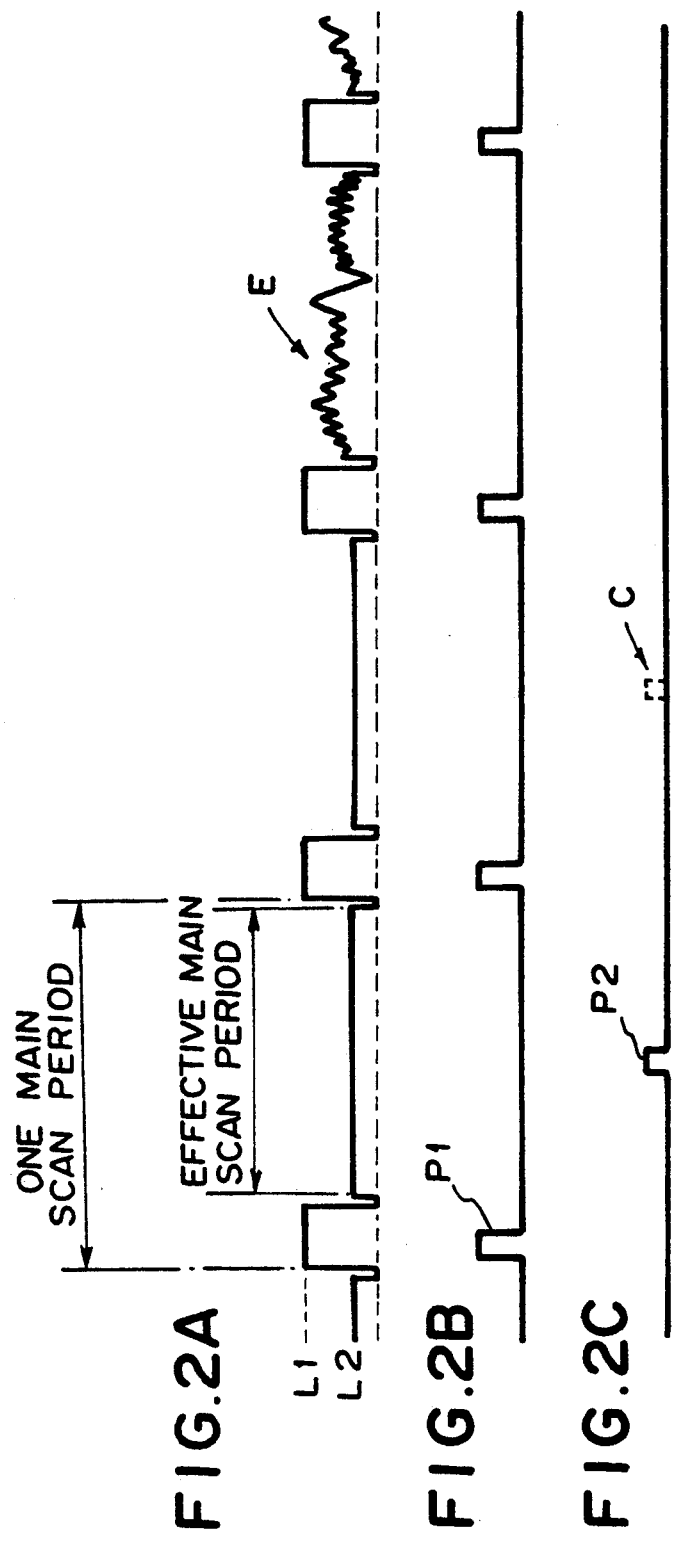

IMAGE REPRODUCING APPARATUS

BACKGROUND OF THE INVENTION

1. Field of the Invention

This invention relates to an image reproducing apparatus. This invention particularly relates to an image reproducing apparatus, wherein a laser beam produced by a semiconductor laser is directly modulated in accordance with an image signal, the modulated laser beam is caused to scan a photosensitive material in a main scanning direction and a sub-scanning direction, and an image represented by the image signal is thereby reproduced on the photosensitive material.

2. Description of the Prior Art

Various image reproducing apparatuses have heretofore been used wherein a light beam is modulated in accordance with an image signal, the modulated light beam is caused to scan a photosensitive material in a main scanning direction and a sub-scanning direction, and an image represented by the image signal is thereby reproduced on the photosensitive material. In such image reproducing apparatuses, semiconductor lasers are often used as light sources for producing the light beams. Semiconductor lasers are advantageous in that, for example, the laser beams produced by the semiconductor lasers can be modulated directly, and the semiconductor lasers can be driven with a small driving electric power.

Basically, such an image reproducing apparatus comprises:

a semiconductor laser for producing a laser beam, a driving circuit for driving the semiconductor laser, a main scanning means for causing the laser beam to scan a photosensitive material in a main scanning direction, a sub-scanning means for moving the photosensitive material with respect to the laser beam in a sub-scanning direction, which is approximately normal to the main scanning direction, and a modulation means for feeding a modulating signal into the semiconductor laser driving circuit, the modulating signal modulating the laser beam in accordance with an image signal.

For the purposes of causing the laser beam, which has been modulated in the manner described above, to scan the photosensitive material in the main scanning direction and in the sub-scanning direction, a technique is often employed wherein the laser beam is caused by a light deflector, such as a rotating polygon mirror or a galvanometer mirror, to scan the photosensitive material in the main scanning direction, and at the same time the photosensitive material is moved with respect to the laser beam in the sub-scanning direction, which is approximately normal to the main scanning direction. In such cases, for the purposes of defining the timing with which the modulation of the laser beam is begun, it is necessary to detect that the leading end of the photosensitive material, which is moving, has reached the position to which the laser beam is irradiated. Also, for the purposes of achieving horizontal synchronization, it is necessary to detect that the laser beam has passed through a predetermined point (i.e., a main-scanning start point) outside of an effective scanning region with respect to the photosensitive material.

In cases where the semiconductor laser is employed as the light source for producing a reproducing light beam, for the purposes of detecting the leading end of the photosensitive material and the main-scanning start point, a semiconductor laser for synchronization has heretofore been provided independently of the semiconductor laser for image reproduction. A synchronizing laser beam, which has been produced by the semiconductor laser for synchronization and has a predetermined intensity, is caused to impinge upon a single light deflector together with the reproducing laser beam. The synchronizing laser beam and the reproducing laser beam are deflected such that the position, which is being scanned with the synchronizing laser beam, and the position, which is being scanned with the reproducing laser beam, correspond to each other. The leading end of the photosensitive material and the main-scanning start point are detected by detecting the synchronizing laser beam. In this manner, the leading end of the photosensitive material and the main scanning start point can be detected accurately by utilizing the synchronizing laser beam, which has not been modulated.

However, in cases where the semiconductor laser for synchronization is provided in addition to the semiconductor laser for image reproduction, the cost of the image reproducing apparatus cannot be kept low. Also, operations for assembling and adjusting the image reproducing apparatus become complicated.

SUMMARY OF THE INVENTION

The primary object of the present invention is to provide an image reproducing apparatus, wherein a single semiconductor laser is utilized to reproduce an image and to detect a leading end of a photosensitive material and a main-scanning start point.

Another object of the present invention is to provide an image reproducing apparatus, which is manufactured at a low cost and is easy to assemble and adjust.

The present invention provides an image reproducing apparatus comprising:

i) a semiconductor laser for producing a laser beam, ii) a semiconductor laser driving circuit for driving the semiconductor laser, iii) a main scanning. means for causing the laser beam to scan a photosensitive material in a main scanning direction, iv) a sub-scanning means for moving the photosensitive material with respect to the laser beam in a sub-scanning direction, which is approximately normal to the main scanning direction, and v) a modulation means for feeding a modulating signal into the semiconductor laser driving circuit, the modulating signal modulating the laser beam in accordance with an image signal, wherein the improvement comprises the provision of:

a) a main-scanning start point detecting sensor for detecting the laser beam at a predetermined position, which is outside of an effective main scanning region with respect to the photosensitive material, b) a leading end detecting sensor for detecting a leading end of the photosensitive material by detecting that the laser beam has been blocked by the leading end of the photosensitive material, which is moving, c) a means for generating a first predetermined level driving signal, which sets an emission intensity of the semiconductor laser at a first predetermined level, d) a means for generating a second predetermined level driving signal, which sets the emission intensity of the semiconductor laser at a second predetermined level lower than the first predetermined level, and e) an input change-over means for selectively feeding the second predetermined level driving signal, the modulating signal, or the first predetermined level driving signal into the semiconductor laser driving circuit such that, during a main scanning period, in which the laser beam is capable of impinging upon the effective main scanning region, the second predetermined level driving signal and the modulating signal are fed into the semiconductor laser driving circuit respectively before and after the leading end detecting sensor detects the leading end of the photosensitive material, and such that, during a main scanning period, in which the laser beam impinges upon the main-scanning start point detecting sensor, the first predetermined level driving signal is fed into the semiconductor laser driving circuit.

With the image reproducing apparatus in accordance with the present invention, during the main scanning period, in which the laser beam impinges upon the main-scanning start point detecting sensor, the intensity of the laser beam is set at the first predetermined level, which is comparatively high, regardless of whether the leading end of the photosensitive material has been or has not been detected. It is desired that the main-scanning start point can be detected accurately by, for example, shaping the wave form of an output signal obtained from the main-scanning start point detecting sensor. As described above, with the image reproducing apparatus in accordance with the present invention, the laser beam having the predetermined, comparatively high intensity, impinges upon the main-scanning start point detecting sensor. Therefore, the output signal having a clear wave form can be obtained from the main-scanning start point detecting sensor, and the main-scanning start point can be detected accurately.

On the other hand, during the main scanning period, in which the laser beam is capable of impinging upon the effective main scanning region with respect to the photosensitive material, before the leading end of the photosensitive material is detected, the intensity of the laser beam is set at the second predetermined level. In this manner, the unmodulated laser beam having the predetermined level is utilized to detect the leading end of the photosensitive material. Therefore, the leading end of the photosensitive material can be detected accurately. Also, if the intensity of the laser beam utilized to detect the leading end of the photosensitive material is excessively high, the photosensitive material will suffer from the so-called "fogging" during the detection of the leading end of the photosensitive material. With the image reproducing apparatus in accordance with the present invention, the intensity of the laser beam is set at the second predetermined level, which is comparatively low, during the detection of the leading end of the photosensitive material. Therefore, the photosensitive material can be prevented from being fogged.

Also, during the main scanning period, in which the laser beam is capable of impinging upon the effective main scanning region with respect to the photosensitive material, after the leading end of the photosensitive material is detected, the modulating signal is fed into the semiconductor laser driving circuit, and the laser beam is modulated in accordance with the image signal. Therefore, with the modulated laser beam, the image represented by the image signal is reproduced on the photosensitive material.

As described above, with the image reproducing apparatus in accordance with the present invention, during the period, in which the detection of the leading end of the photosensitive material can be carried out, and during the main scanning period, in which the detection of the main-scanning start point can be carried out, the semiconductor laser is controlled such that it may produce the laser beam having the predetermined intensity levels suitable for the respective detecting operations. Also, during the effective main scanning period, in which the image is to be reproduced on the photosensitive material, the semiconductor laser is directly modulated in accordance with the image signal. Therefore, a single semiconductor laser can be utilized both for the image reproduction and for the synchronization. Accordingly, the image reproducing apparatus in accordance with the present invention can be manufactured at a lower cost and is easier to assembly and adjust than a conventional image reproducing apparatus, in which a semiconductor laser for the image reproduction and a semiconductor laser for the synchronization are provided.

BRIEF DESCRIPTION OF THE DRAWINGS

FIG. 1 is a schematic view showing an embodiment of the image reproducing apparatus in accordance with the present invention, and FIGS. 2A, 2B, and 2C are graphs showing the intensity levels of a laser beam and changes in wave forms of sensor output signals in the embodiment of FIG. 1.

DESCRIPTION OF THE PREFERRED EMBODIMENTS

The present invention will hereinbelow be described in further detail with reference to the accompanying drawings.

FIG. 1 is a schematic view showing an embodiment of the image reproducing apparatus in accordance with the present invention. As illustrated in FIG. 1, a laser beam 11 is produced by a semiconductor laser 10. The laser beam 11 is collimated by a collimator lens 12 and then impinges upon a rotating polygon mirror 13, which serves as a main scanning means. The laser beam 11 is reflected and deflected by the rotating polygon mirror 13 in the direction indicated by the arrow A. Thereafter, the laser beam 11 passes through a scanning lens, which may be constituted of an fθ lens, and scans a photosensitive material 15 in a main scanning direction, which is indicated by the arrow X. By way of example, the photosensitive material 15 is constituted of silver halide photographic film, or the like. The photosensitive material 15 is conveyed at a predetermined speed by an endless belt 16 in a sub-scanning direction indicated by the arrow Y, which direction is normal to the main scanning direction indicated by the arrow X. The endless belt 16 serves as a sub-scanning means. In this manner, the photosensitive material 15 is scanned with the laser beam 11 in the main scanning direction and in the sub-scanning direction.

How the laser beam 11 is modulated will be described hereinbelow. A digital image signal D, which represents an image, is fed into a gradation correcting device 20. In the gradation correcting device 20 the digital image signal D is subjected to a gradation correcting process in accordance with a gradation correction table. The digital image signal D, which has been obtained from the gradation correcting device 20, is fed into a D/A converter 21 and is thereby converted into an analog image signal S. The image signal S is amplified by a variable gain amplifier 22 and is then fed into a third switch 23. The third switch 23 is set to an open position and a closed position by a control circuit 24 in the manner, which will be described later. When the third switch 23 is closed, the image signal S is fed as a modulating signal therethrough into a semiconductor laser driving circuit 25. The semiconductor laser driving circuit 25 drives the semiconductor laser 10. When the image signal S is fed into the semiconductor laser driving circuit 25, the semiconductor laser 10 is directly modulated in accordance with the image signal S. In this manner, the intensity of the laser beam 11 is modulated in accordance with the image signal D, and the image represented by the image signal D is reproduced as a photographic latent image on the photosensitive material 15. Thereafter, the photosensitive material 15, on which the photographic latent image has been reproduced, is subjected to a development process, and the latent image is thereby developed into a visible image.

As is clear from the aforesaid explanation, in this embodiment, a modulation means for modulating the laser beam 11 is constituted of the gradation correcting device 20, the D/A converter 21, and the variable gain amplifier 22.

How the modulation of the laser beam 11 and the scanning operation are synchronized with each other will be described hereinbelow. The semiconductor laser driving circuit 25 is connected to a first driving signal generator 32 by a first switch 30. The semiconductor laser driving circuit 25 is also connected to a second driving signal generator 33 by a second switch 31. The first driving signal generator 32 and the second driving signal generator 33 respectively generates a first predetermined level driving signal S1 and a second predetermined level driving signal S2, which drive the semiconductor laser 10 such that it may generates predetermined levels of outputs. The opening and closing operations for the first switch 30 and the second switch 31 are controlled by the control circuit 24.

A main-scanning start point detecting sensor 34, which detects the laser beam 11 and may be constituted of a photodiode, or the like, is located at a position outside of the effective main scanning region of the laser beam 11 with respect to the photosensitive material 15. The endless belt 16 is constituted of a transparent material. A leading end detecting sensor 35 is located inside of the space defined by the endless belt 16 such that the leading end detecting sensor 35 can receive the laser beam 11, which impinges upon the effective main scanning region. The leading end detecting sensor 35 may be constituted of a photodiode, or the like. The main-scanning start point detecting sensor 34 and the leading end detecting sensor 35 respectively generate an output signal P1 and an output signal P2. The output signals P1 and P2 are fed into the control circuit 24.

When the photosensitive material 15 is conveyed on the endless belt 16 in the direction indicated by the arrow Y, and the leading end of the photosensitive material 15 reaches the position indicated by, for example, the arrow B, the control circuit 24 detects this state by means of, for example, predetermined sequence control. At this time, the control circuit 24 begins controlling the opening and closing operations for the first switch 30 and the second switch 31. Specifically, during the main scanning period, in which the laser beam 11 impinges upon a position in the vicinity of the main-scanning start point detecting sensor 34, the first switch 30 is closed, and the second switch 31 is opened. Also, during the effective main scanning period, in which the laser beam 11 is capable of scanning the photosensitive material 15, the first switch 30 is opened, and the second switch 31 is closed.

Therefore, during the main scanning period, in which the laser beam 11 impinges upon a position in the vicinity of the main-scanning start point detecting sensor 34, the first predetermined level driving signal S1 is fed into the semiconductor laser driving circuit 25. The semiconductor laser 10 is thereby caused to produce the laser beam 11 having a first predetermined intensity level L1, which is shown in FIG. 2A. Also, during the effective main scanning period, the second predetermined level driving signal S2 is fed into the semiconductor laser driving circuit 25, and the semiconductor laser 10 is thereby caused to produce the laser beam 11 having a second predetermined intensity level L2, which is shown in FIG. 2A. Controlling the opening and closing operations of the first switch 30 and the second switch 31 in a manner approximately synchronized with the main scanning of the laser beam 11 can be achieved by feeding a polygon mirror rotation angle signal R from a drive circuit 40 for the rotating polygon mirror 13 into the control circuit 24.

When the semiconductor laser 10 is controlled in the manner described above, the main-scanning start point detecting sensor 34 generates the output signal P1 shown in FIG. 2B. Also, the leading end detecting sensor 35 generates the output signal P2 shown in FIG. 2C. As described above, during the main scanning period, in which the laser beam 11 impinges upon a position in the vicinity of the main-scanning start point detecting sensor 34, the intensity of the laser beam 11 is set at the first level L1, which is comparatively high. Therefore, when the main-scanning start point detecting sensor 34 receives the laser beam 11, the output signal P1 generated by the main-scanning start point detecting sensor 34 rises with a clear wave form. Accordingly, in the control circuit 24, a horizontal synchronizing signal Hsync, which represents that the laser beam 11 has passed through the predetermined main-scanning start point, can be generated by, for example, shaping the wave form of the output signal P1.

When the photosensitive material 15 is further conveyed and its leading end reaches the position exposed to the laser beam 11, the laser beam 11 irradiated to the leading end detecting sensor 35 is blocked by the leading end of the photosensitive material 15. As a result, in the output signal P2 generated by the leading end detecting sensor 35, as indicated by the arrow C in FIG. 2C, the pulsed wave form, which has been generated before due to the detection of the laser beam 11, disappears. The control circuit 24 detects the disappearance of the pulsed wave form. Thereafter, during the effective main scanning period, in which the second switch 31 has been closed, the control circuit 24 opens the second switch 31 and closes the third switch 23. Therefore, during the effective main scanning period, the image signal S is fed into the semiconductor laser driving circuit 25. As a result, as indicated by the arrow E in FIG. 2A, the semiconductor laser 10 generates the laser beam 11, which has been modulated in accordance with the image signal S, and the image represented by the image signal S is reproduced on the photosensitive material 15.

In this case, the timing, with which the image signal S is fed into the semiconductor laser driving circuit 25, is synchronized with the main scanning of the laser beam 11 by feeding picture element clock pulses, which are synchronized with the horizontal synchronizing signal Hsync formed by the control circuit 24 in accordance with the output signal P1 of the main-scanning start point detecting sensor 34, into the D/A converter 1, and thereby controlling the timing, with which the digital image signal D is converted into the analog image signal S.

At the time at which the leading end of the photosensitive material 15 is detected in the manner described above, the leading end is exposed to the laser beam 11. However, at this time, the intensity of the laser beam 11 is set at the second level L2, which is comparatively low. Therefore, the photosensitive material 15 does not suffer from fogging.

In the image reproducing apparatus described above, for example, for the purposes of coping with a change in the characteristics of a developing solution, which is used during the development process carried out on the photosensitive material 15, a fluctuation in characteristics for different lots of photosensitive materials 15, and a change in the driving current vs. output characteristics of the semiconductor laser 10 with the passage of time, it is necessary to change the characteristics of the gradation correction table in the gradation correcting device 20 or to change the gain of the variable gain amplifier 22. The first predetermined level driving signal S1 and the second predetermined level driving signal S2 are fed into the semiconductor laser driving circuit 25 at the stage after the gradation correcting device 20 and the variable gain amplifier 22. Therefore, even if the operation is carried out to change the characteristics of the gradation correction table in the gradation correcting device 20 or to change the gain of the variable gain amplifier 22, the levels of the first predetermined level driving signal S1 and the second predetermined level driving signal S2 do not fluctuate, and no adverse effects occur on the detection of the main-scanning start point and the detection of the leading end of the photosensitive material 15.

In the embodiment described above, the intensity of the laser beam 11 is modulated in order for the image to be reproduced. The image reproducing apparatus in accordance with the present invention is also applicable when the laser beam 11 is subjected to on-off modulation. Additionally, in the aforesaid embodiment, before the leading end detecting sensor 35 detects the leading end of the photosensitive material 15, the first predetermined level driving signal S1 or the second predetermined level driving signal S2 is selectively fed into the semiconductor laser driving circuit 25 in accordance with the main scanning period. Alternatively, before the leading end detecting sensor 35 detects the leading end of the photosensitive material 15, the second predetermined level driving signal S2 may be fed into the semiconductor laser driving circuit 25 during the whole main scanning period, and the first predetermined level driving signal S1 may be added to the second predetermined level driving signal S2 only during the main scanning period, in which the laser beam 11 impinges upon the main-scanning start point detecting sensor 34.

Further, the leading end detecting sensor 35 may be located such that it may receive the laser beam 1, which has been reflected by the leading end of the photosensitive material 15, and the detection of the leading end of the photosensitive material 15 may be carried out by detecting the pulsed rising point of the output signal P2 generated by the leading end detecting sensor 35.

What is claimed is:

1. An image reproducing apparatus comprising:
   i) a semiconductor laser for producing a laser beam,
   ii) a semiconductor laser driving circuit for driving the semiconductor laser,
   iii) a main scanning means for causing the laser beam to scan a photosensitive material in a main scanning direction,
   iv) a sub-scanning means for moving the photosensitive material with respect to the laser beam in a sub-scanning direction, which is approximately normal to the main scanning direction, and
   v) a modulation means for feeding a modulating signal into the semiconductor laser driving circuit, the modulating signal modulating the laser beam in accordance with an image signal, wherein the improvement comprises the provision of:
   a) a main-scanning start point detecting sensor for detecting said laser beam at a predetermined position, which is outside of an effective main scanning region with respect to said photosensitive material,
   b) a leading end detecting sensor for detecting a leading end of said photosensitive material by detecting that said laser beam has been blocked by the leading end of said photosensitive material, which is moving,
   c) a means for generating a first predetermined level driving signal, which sets an emission intensity of said semiconductor laser at a first predetermined level,
   d) a means for generating a second predetermined level driving signal, which sets the emission intensity of said semiconductor laser at a second predetermined level lower than said first predetermined level, and
   e) an input change-over means for selectively feeding said second predetermined level driving signal, said modulating signal, or said first predetermined level driving signal into said semiconductor laser driving circuit such that, during a main scanning period, in which said laser beam is capable of impinging upon said effective main scanning region, said second predetermined level driving signal and said modulating signal are fed into said semiconductor laser driving circuit respectively before and after said leading end detecting sensor detects the leading end of said photosensitive material, and such that, during a main scanning period, in which said laser beam impinges upon said main-scanning start point detecting sensor, said first predetermined level driving signal is fed into said semiconductor laser driving circuit.

2. An apparatus as defined in Claim 1 wherein said photosensitive material is silver halide photographic film.

3. An apparatus as defined in Claim 1 wherein said modulating signal modulates the intensity of said laser beam in accordance with said image signal.

* * * * *